Patented Oct. 6, 1942

2,297,702

UNITED STATES PATENT OFFICE 2,297,702

PROCESS OF TREATING ANIMAL FIBERS

Gustave Theodore Hug, Penns Grove, N. J., assignor to E. I. du Pont de Nemours & Company, Wilmington, Del., a corporation of Delaware No Drawing. Application July 18, 1941,
Serial No. 403,074

7 Claims. (Cl. 8—47)

This application is a continuation-in-part of my application for patent Serial No. 329,108, filed April 11, 1940, and deals primarily with a process of treating animal fiber, especially wool, whereby to increase its affinity for various organic compounds as more fully defined below.

In my copending application above referred to I have shown that if wool is treated with certain specified agents it acquires increased affinity for indigo and other vat dyestuffs, as a result of which wool may be dyed with said dyestuffs from an alkaline bath in a sufficiently short time to avoid substantial injury to the animal fiber by the alkaline liquors.

I have now found that my invention is of much broader scope and applies in general to any case where animal fiber is to be impregnated from an aqueous alkaline bath with an organic compound which can be rendered soluble only by virtue of transforming it into a compound having one or more O—Na groups attached to carbon (or equivalent groups of form OM wherein M is an alkalimetal). For simplicity of discussion, I shall refer to such compounds hereinafter as organic compounds which may be rendered soluble in water by transformation into an OM compound, M being an alkali metal.

Practical examples of such compounds are:

I. Naphthol derivatives, as typified by alpha-naphthol, beta-naphthol, 2,3-hydroxynaphthoic acid, and the various arylides of 2,3-hydroxynaphthoic acid which are well known in the art of dyeing textiles by means of the so-called "ice colors." These compounds are not soluble in neutral or weakly acid water, but they dissolve readily in alkaline aqueous baths, presumably by forming an OM compound in solution by direct action of the alkali on the phenolic OH group.

II. Vat dyes of the anthraquinone or indigoid series. These, as is well known, are characterized by their content of ketonic groups (CO) in the molecule, and by their insolubility in water. They may be brought into solution however by "vatting," that is treating them with an aqueous bath containing both alkali and a reducing agent. The accepted theory of this prenomenon is that the =CO group is reduced into a ≡C—OH group (the so-called "leuco-form") which is instantly neutralized by the alkali present into the form ≡C—ONa, or equivalent form ≡C—OM, depending on the particular alkali selected.

Other examples, entirely outside the dyeing field, might be named, but it is believed that the above two examples will suffice.

To put it in different words, I have found that if animal fiber, particularly wool, is given a treatment with certain specified agents according to my copending application above referred to, it acquires the property of absorbing ≡C—O—M-type organic compounds from aqueous solution to a greater extent and at a much faster rate that the same fiber normally does when not pretreated according to this invention. This discovery is of tremendous practical significance, because it enables the commercial treatment of wool with dyes, intermediates or other organic substances which, being insoluble except by conversion into said ≡COM form, require an alkaline bath for their solution, and which for said reason have hitherto not been economically applicable on a practical scale to animal fiber. As a simple illustration of the practical value of my invention it may be stated that my invention will enable wool to be dyed with indigo or other vat colors as well as with azoic ice-colors (by the so-called "ice-color" process).

Furthermore, the increased speed of absorption of such dyes, intermediates or other substances from their alkaline solution, enables the development of continuous processes for treatment of animal fiber in the form of piece goods.

As treating agents for the purpose of my invention the following were mentioned in my parent application: formamidine-sulfinic acid, hydrosulfite, the aldehyde sulfoxylates, the bisulfites and the water-soluble sulfides. All these were classed under the single heading of sulfur-containing, vat-reducing agents. The same group of agents may be used for the purposes of the instant invention.

In general, the pre-treatment of the animal fiber according to this invention and the subsequent dyeing operation may follow the details set forth in my parent application above referred to. Thus, the concentration of the reagent in the treatment bath may vary as in my parent application, the preferred concentration being about 2 to 3 ounces per gallon. The padding may be carried out at a temperature of about 140 to 160° F., and the subsequent steaming at atmospheric pressure. In place of padding and steaming, the pre-treatment may be effected by immersing the wool in a bath containing one of the compounds mentioned above, and heating the treated wool or the entire bath at an elevated temperature. The quantity of reagent in this case may be 3 to 5% based on the weight of the animal fiber, and the heat treatment may be applied for 5 to 30 minutes at a temperature of 160 to 212° F. Under special circumstances, the heat treatment of the impregnated wool may be carried out at temperatures as high as 300° F.

Without intent to limit my invention thereby, the following examples are given to illustrate my preferred mode of operation. Parts mentioned are by weight.

*Example 1.*—Wool felt is padded at 150° F. through an aqueous solution containing 2½ ounces per gallon of formamidine sulfinic acid. The time of immersion is approximately 3 seconds (operative range 1 to 10 seconds) and the squeezing rolls are adjusted to permit the material to retain 100% of its weight of moisture. The impregnated material is then run directly into a steamer where it is steamed for 3 minutes (operative range 1 to 5 minutes) at atmospheric pressure and then run through a rinse box containing water of about 80° F. After squeezing to remove excess moisture, the steamed and rinsed felt is run through an aqueous bath containing 1⅓ ounces per gallon of the anilide of 2,3-hydroxynaphthoic acid, previously dissolved by pasting with alcohol and adding the necessary amount of caustic soda. In place of alcohol, Turkey red oil may be used, but in either case the procedure followed is exactly the same as is commonly practiced in cotton dyeing. Time of immersion is 2 minutes at 80–100° F.

Following this treatment the felt is squeezed to remove excess moisture and is dried at 240–275° F. The felt is then run through an aqueous bath containing ¼ ounce per gallon of 4-nitro-2-amino-anisole, previously dissolved and diazotized according to standard procedure with the necessary amounts of hydrochloric acid and sodium nitrate. Time of immersion in this bath is approximately 3 minutes at 70–80° F. The dyed felt is then passed between squeeze rollers to remove excess moisture, rinsed and soaped at 140–180° F.

The shades so obtained are very much fuller and brighter than when untreated wool is dyed in a bath of the same strength.

*Example 2.*—Wool crepe is pre-treated by padding through a solution containing 2½ ounces per gallon of sodium formaldehyde sulfoxylate, steaming and rinsing as described in Example 1. After impregnating with the anilide of 2,3-hydroxynaphthoic acid, drying and coupling with 4-nitro-2-amino-anisole as described in Example 1, much heavier shades are obtained than if the pre-treatment is omitted.

*Example 3.*—Wool flannel is pre-treated by padding through a solution containing 2 ounces per gallon of sodium bisulfite, steaming and rinsing and subsequently impregnating with the anilide of 2,3-hydroxynaphthoic acid, drying and coupling with 4-nitro-2-amino-anisole as described in Example 1. Much heavier shades are obtained than when the pre-treatment is omitted.

*Example 4.*—Wool skeins are pre-treated by immersing for 15 minutes at 200° F., at a volume of 40:1, in an aqueous bath containing 5% formamidine sulfinic acid, based on the weight of the material. After draining and rinsing, the skeins are impregnated for 2 minutes at 80–100° F. in an aqueous bath containing ½ ounce per gallon of the anilide of 2,3-hydroxynaphthoic acid, previously dissolved in water with the addition of a small amount of caustic soda. After impregnation, the skeins are well squeezed to remove excess moisture and are then immersed for 5 minutes in an aqueous bath containing ⅙ ounce per gallon of previously dissolved and diazotized 4-nitro-2-amino-anisole at 70–80° F. After soaping, the pre-treated skeins are much heavier in shade than material not thus pre-treated.

Equally satisfactory results are obtained by the substitution of 5% sodium sulfide, based on the weight of the material, for the formamidine sulfinic acid.

*Example 5.*—Wool crepe is pre-treated by padding through an aqueous solution containing 2½ ounces per gallon of formamidine sulfinic acid, steaming and rinsing as described in Example 1. After squeezing to remove excess moisture, the steamed and rinsed crepe is run through a bath containing 1½ ounces per gallon of beta-naphthol, previously dissolved in water with the addition of a small amount of caustic soda. Time of immersion is 2 minutes at 80–100° F.

Following this treatment the crepe is squeezed to remove excess moisture, dried at 240 to 275° F. and then run through an aqueous bath containing ¼ ounce per gallon of previously dissolved and diazotized p-nitrotoluidine. Time of immersion in this bath is approximately 3 minutes at 70 to 80° F. The dyed crepe is then passed between squeeze rollers to remove excess moisture, rinsed and soaped at 140 to 180° F.

The shades so obtained are very much fuller and brighter than when untreated wool is dyed in a bath of the same strength.

*Example 6.*—Wool crepe is pre-treated with formamidine sulfinic acid as described in Example 1. After steaming and rinsing, the material is dyed as described in Example 1, the color selected in this case being 1 ounce per gallon of the alpha-naphthylamide of 2,3-hydroxynaphthoic acid and is coupled, after drying the fabric, with ½ ounce per gallon of m-nitroaniline.

The dyeing is considerably stronger than that obtainable on untreated wool.

*Example 7.*—Wool flannel is pretreated with sodium bisulfite as described in Example 3. After steaming and rinsing, the material is impregnated as described in Example 1, the color selected in this case being 1 ounce per gallon of the anilide of 2,3-hydroxynaphthoic acid subsequently coupled, after drying, with ½ ounce per gallon of 4-carbomethoxyamino-2,5-diethoxyaniline.

The thus pre-treated material is dyed very much heavier than untreated wool.

*Example 8.*—Wool flannel is pre-treated with sodium formaldehyde sulfoxylate as described in Example 2. After steaming and rinsing, the material is impregnated as described in Example 1, the color selected being 1 ounce per gallon of the o-toluidide of 2,3-hydroxynaphthoic acid subsequently coupled, after drying, with ½ ounce per gallon of 4-nitro-2-amino toluene.

The dyeing is very much stronger than that obtainable on untreated material.

*Example 9.*—Wool flannel is pre-treated with formamidine sulfinic acid as described in Example 1. After steaming and rinsing, the material is impregnated as described in Example 1, the color selected being ¼ ounce per gallon of the beta-naphthylamide of 2,3-hydroxynaphthoic acid subsequently coupled, after drying, with ½ ounce per gallon of 4-chloro-2-amino-toluene hydrochloride.

Very much fuller and brighter shades are thus obtained than if untreated wool is dyed in a bath of equal strength.

It will be understood that my invention is susceptible of wide variation in details, within the skill of those versed with this art, without departing from the spirit of this invention.

I claim:

1. A process for treating animal fiber whereby to increase its affinity for organic compounds which dissolve in water only after transformation into an OM-type compound, wherein M stands for an alkali-metal, which comprises impregnating said animal fiber with a sulfur-containing vat reducing agent, the concentration of the agent and the temperature and duration of the treatment being less than those which would reduce the fiber to a rubber-like condition, and subjecting the fiber to heat at a temperature between 160 and 300° F.

2. A process for treating animal fiber whereby to increase its affinity for compounds selected from the group consisting of vat dyes and water-insoluble, alkali-soluble naphthol derivatives, which comprises impregnating said animal fiber with an aqueous bath containing a sulfur-containing, vat-reducing agent, the concentration of the agent and the temperature and duration of the treatment being less than those which would reduce the fiber to a rubber-like condition, and then subjecting the fiber to steaming at a temperature between 160 and 300° F.

3. A process of dyeing wool fiber with an azoic dyestuff of the class generally referred to as azoic "ice-colors," which comprises impregnating said wool, in the absence of alkali, with an aqueous bath of a sulfur-containing, vat-reducing agent; subjecting the fiber to a heat treatment at a temperature between 160 and 300° F.; then impregnating the fiber with an alkaline bath containing an "ice-color" coupling component, drying the fiber, and further treating the same with an aqueous bath containing a diazonium compound to develop an azo dye on the fiber.

4. A process of dyeing wool fiber with azoic colors, which comprises impregnating said fiber, in the absence of alkali, with an aqueous bath containing per gallon from 2 to 3 ounces of formamidine-sulfinic acid; steaming the impregnated fiber at about atmospheric pressure, and then treating the same with an alkaline aqueous solution of an arylide of 2,3-hydroxynaphthoic acid, drying the fiber, and further treating the same with an aqueous solution of a diazonium compound to develop an azo dye on the fiber.

5. The process of preparing animal fiber for dyeing with compounds selected from the group consisting of vat dyes and azoic "ice-colors," which comprises impregnating the same with an aqueous bath containing, per gallon, from 2 to 3 ounces of formamidine-sulfinic acid, and subjecting the fiber to a heat treatment at a temperature between 160° and 300° F.

6. The process of preparing animal fiber for dyeing with compounds selected from the group consisting of vat dyes and azoic "ice-colors," which comprises impregnating the same with an aqueous bath containing, per gallon, from 2 to 3 ounces of sodium-formaldehyde-sulfoxylate, and subjecting the fiber to a heat treatment at a temperature between 160° and 300° F.

7. The process of preparing animal fiber for dyeing with compounds selected from the group consisting of vat dyes and azoic "ice-colors," which comprises impregnating the same with an aqueous bath containing, per gallon, from 2 to 3 ounces of sodium-bisulfite, and subjecting the fiber to a heat treatment at a temperature between 160° and 300° F.

GUSTAVE THEODORE HUG.